US011165927B2

(12) United States Patent
Minegishi

(10) Patent No.: US 11,165,927 B2
(45) Date of Patent: Nov. 2, 2021

(54) INFORMATION PROCESSING APPARATUS, RECORDING MEDIUM, AND IMAGE FORMING SYSTEM FOR MAINTAINING A COMMUNICATION WITH AN IMAGE FORMING APPARATUS

(71) Applicant: Youichi Minegishi, Kanagawa (JP)

(72) Inventor: Youichi Minegishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/722,136

(22) Filed: Dec. 20, 2019

(65) Prior Publication Data

US 2020/0213471 A1 Jul. 2, 2020

(30) Foreign Application Priority Data

Dec. 28, 2018 (JP) .............................. JP2018-248206

(51) Int. Cl.
*H04N 1/327* (2006.01)
*H04N 1/32* (2006.01)

(52) U.S. Cl.
CPC ..... *H04N 1/32776* (2013.01); *H04N 1/32459* (2013.01); *H04N 1/32786* (2013.01); *H04N 1/32795* (2013.01)

(58) Field of Classification Search
None
See application file for complete search history.

(56) References Cited

U.S. PATENT DOCUMENTS

| 6,760,369 B1* | 7/2004 | Chida ................ H04N 1/33323 370/468 |
| 2003/0169309 A1* | 9/2003 | Yokoyama ............. B41J 29/393 347/14 |
| 2005/0270565 A1 | 12/2005 | Shima et al. |
| 2012/0120440 A1* | 5/2012 | Ueda .................. H04N 1/00938 358/1.15 |
| 2014/0025832 A1* | 1/2014 | Ito ....................... H04L 65/1069 709/228 |
| 2018/0096236 A1* | 4/2018 | Bermundo ........... G06K 15/007 |

FOREIGN PATENT DOCUMENTS

| JP | 2005-322054 | 11/2005 |
| JP | 2012-109730 | 6/2012 |
| JP | 2016-126444 | 7/2016 |

* cited by examiner

*Primary Examiner* — Andrew H Lam
(74) *Attorney, Agent, or Firm* — IPUSA, PLLC

(57) ABSTRACT

An information processing apparatus controls a printing process performed by an image forming apparatus. The information processing apparatus includes a communication controller configured to perform communication with the image forming apparatus; a display controller configured to cause a display to display an operation screen for accepting a setting or an operation relating to the printing process; a data transmitter configured to transmit predetermined data by the communication to the image forming apparatus, while the operation screen is being displayed; and a renderer configured to generate print data to be transmitted to the image forming apparatus by the communication, according to the setting or the operation accepted at the operation screen.

21 Claims, 12 Drawing Sheets

FIG.6

FAX TRANSMISSION SETTING

PLEASE SPECIFY DESTINATION AND CLICK "START" BUTTON.

LIST OF TRANSMISSION DESTINATIONS: 0 ITEM

| NAME | COMPANY NAME | DEPARTMENT NAME | NUMBER/ADDRESS |

DELETE FROM LIST

601 — DESTINATION TABLE
602 — TRANSMISSION OPTION

SPECIFY DESTINATION

⬅ ADD TO LIST OF TRANSMISSION DESTINATIONS

DIRECTLY SPECIFY DESTINATION

SPECIFY DESTINATION
SWITCH DESTINATION LIST: DESTINATION LIST ▽

MANAGE DESTINATION LIST

FORMAT: INDIVIDUAL ▽      TYPE: FAX ▽      ITEM: NAME ▽      SEARCH CONTENT

| ALL | A | B | C | D | E | F | G | H | I | J | K | OTHER |

| NAME | PHONETIC CHARACTERS | COMPANY NAME | PHONETIC CHARACTERS | DEPARTMENT NAME | FAX NUMBER |

NO CORRESPONDING DATA

EDIT DESTINATION LIST
VERSION INFORMATION
HELP

603 — START      CANCEL

```
<ESC>%-12345X@PJL JOB
@PJL SET HOGEHOGE=1234
```
701

FIG.7B

```
@PJL SET HOGEHOGE=1234
```
702

FIG.7C

```
%-12345X@PJL EOJ
```
703

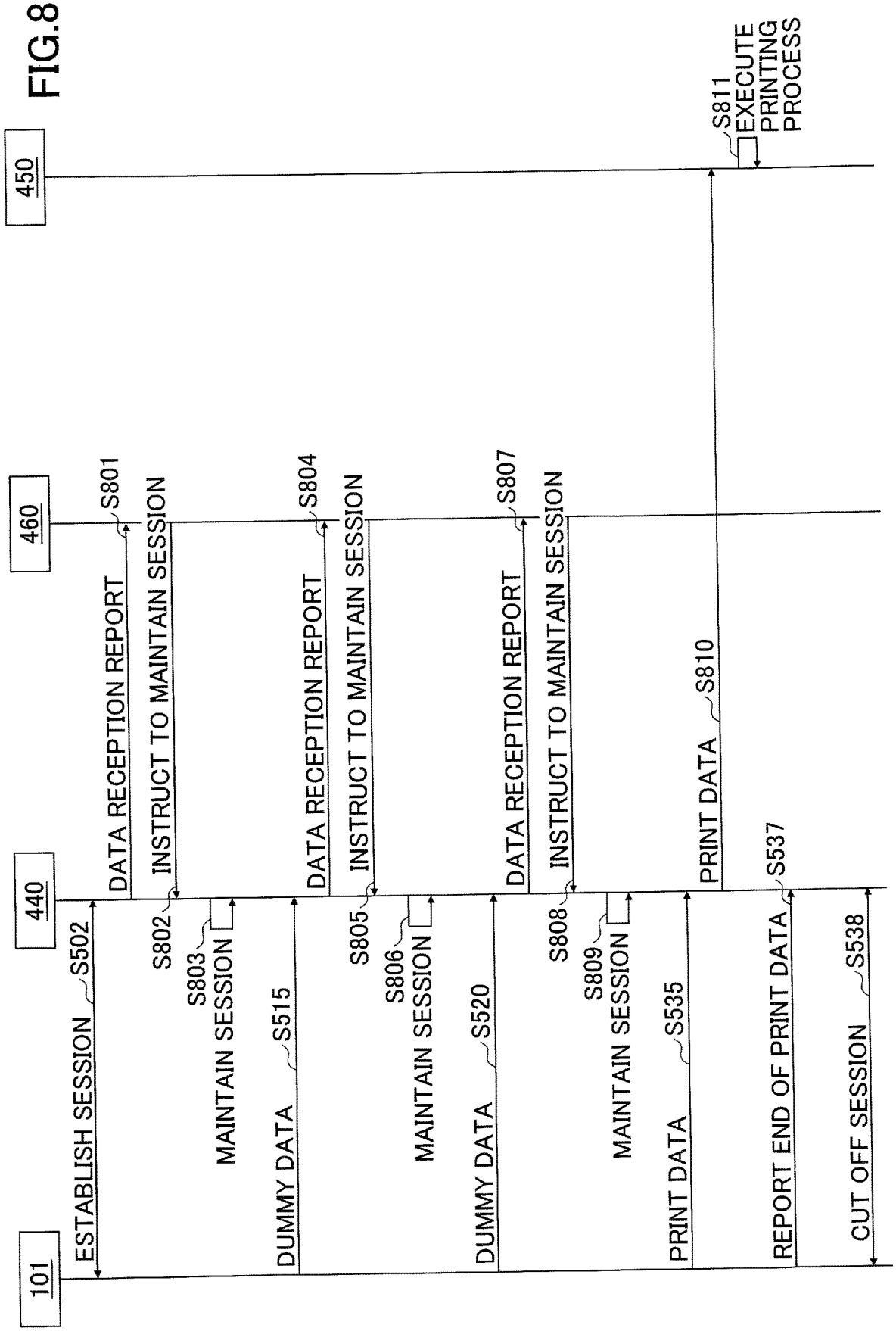

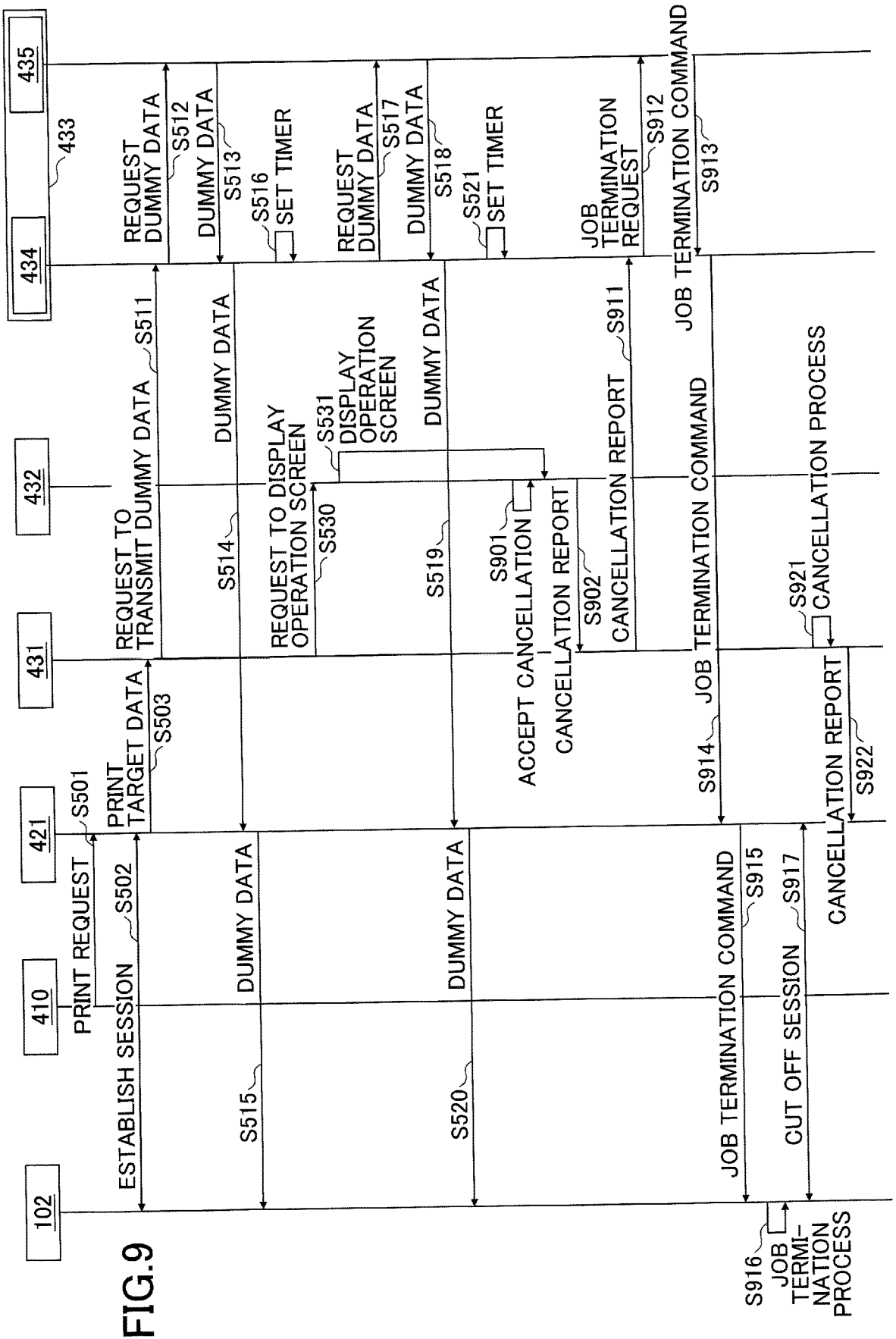

INFORMATION PROCESSING APPARATUS, RECORDING MEDIUM, AND IMAGE FORMING SYSTEM FOR MAINTAINING A COMMUNICATION WITH AN IMAGE FORMING APPARATUS

CROSS-REFERENCE TO RELATED APPLICATION

The present application is based on and claims priority under 35 U.S.C. § 119 to Japanese Patent Application No. 2018-248206, filed on Dec. 28, 2018, the contents of which are incorporated herein by reference in their entirety.

BACKGROUND OF THE INVENTION

1. Field of the Invention

The present invention relates to an information processing apparatus, a recording medium, and an image forming system.

2. Description of the Related Art

An image forming system including an image forming apparatus for executing a printing process and an information processing apparatus for controlling the printing process by the image forming apparatus, is known.

For example, there is known an image processing system in which session information of a terminal (terminal apparatus) is stored in association with a print condition set by the terminal, and when a print request is accepted from the terminal, the print condition stored in association with the session information of the terminal, is applied (see, for example, Patent Document 1).

Patent Document 1: Japanese Unexamined Patent Application Publication No. 2016-126444

SUMMARY OF THE INVENTION

According to one aspect of the present invention, there is provided an information processing apparatus that controls a printing process performed by an image forming apparatus, the information processing apparatus including a communication controller configured to perform communication with the image forming apparatus; a display controller configured to cause a display to display an operation screen for accepting a setting or an operation relating to the printing process; a data transmitter configured to transmit predetermined data by the communication to the image forming apparatus, while the operation screen is being displayed; and a renderer configured to generate print data to be transmitted to the image forming apparatus by the communication, according to the setting or the operation accepted at the operation screen.

BRIEF DESCRIPTION OF THE DRAWINGS

FIG. 6 is a diagram illustrating an example of an operation screen according to the first embodiment of the present invention;

FIGS. 7A to 7C are diagrams illustrating examples of control information according to the first embodiment of the present invention;

FIG. 8 is a sequence diagram illustrating an example of a process of the image forming apparatus according to the first embodiment of the present invention;

FIG. 9 is a sequence diagram illustrating an example of a cancellation process according to the first embodiment of the present invention;

DETAILED DESCRIPTION OF THE PREFERRED EMBODIMENTS

The technique described in Patent Document 1 assumes that the communication established between the information processing apparatus (terminal) and the image forming apparatus (image processing apparatus) is maintained until a printing request is made.

However, in the information processing apparatus for which communication with the image forming apparatus is managed by the operating system (OS), there are cases where the communication is cut off during the printing process (for example, while waiting for an operation by a user upon displaying an operation screen for accepting settings and operations relating to printing).

A problem to be addressed by an embodiment of the present invention is to reduce occurrences of the communication being cut off during a printing process, in an information processing apparatus in which communication with an image forming apparatus is managed by an OS during the printing process.

Hereinafter, embodiments of the present invention will be described in detail with reference to the drawings.

<System Configuration>

Figure 1:
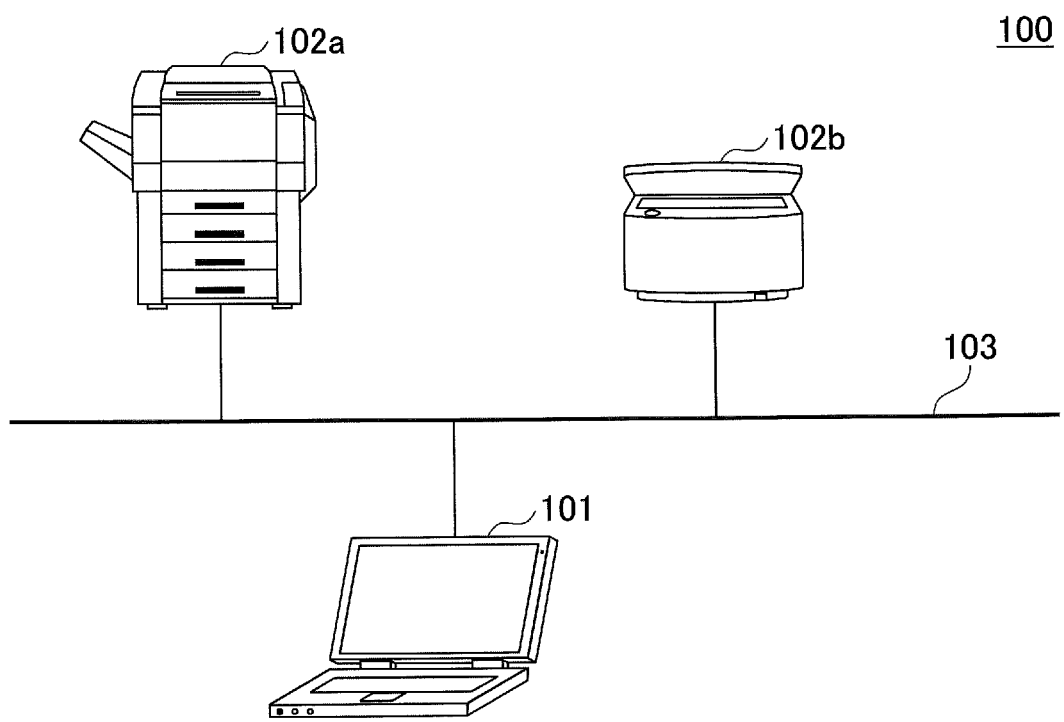
FIG. 1 is a diagram illustrating an example of a system configuration of an image forming system according to an embodiment of the present invention.

FIG. 1 is a diagram illustrating an example of a system configuration of an image forming system according to an embodiment. In an image forming system 100, for example, image forming apparatuses 102a and 102b that execute a printing process and an information processing apparatus 101 that controls a printing process by the image forming apparatus 102a or the image forming apparatus 102b, are communicably connected to each other via a communication network 103. Note that in the following description, when referring to any one of the image forming apparatuses 102a and 102b, the "image forming apparatus 102" is used.

The information processing apparatus 101 is, for example, an information terminal such as a Personal Computer (PC), a tablet terminal, a smartphone, and the like. The information processing apparatus 101 controls a printing process by the image forming apparatus 102, for example, by executing a printer driver that is a program for controlling the printing. Here, as an example, the following description will be given on the assumption that the information processing apparatus 101 is a PC that executes the Windows OS (registered trademark) of Windows OS (registered trademark) 8 or beyond and a printer driver of a Version 4 (hereinafter referred to as V4) printer driver or beyond.

However, the OS executed by the information processing apparatus 101 may be an OS other than Windows OS. Further, the printer driver executed by the information processing apparatus 101 may be a printer driver other than the V4 printer driver.

In the example of FIG. 1, the information processing apparatus 101 communicates with the image forming apparatus 102 via the communication network 103, such as the Internet or a local area network (LAN), and can cause the image forming apparatus 102 to execute a printing process. Note that the information processing apparatus 101 and the image forming apparatus 102 may be communicatively connected, for example, by a wired cable such as Universal Serial Bus (USB) or by wireless communication such as wireless LAN communication or near field communication.

The image forming apparatus 102a is, for example, a Multifunction Peripheral (MFP) in which a scanning function, a copy function, a printing function, a facsimile (fax) function, and the like are mounted in a single case. The image forming apparatus 102b is, for example, a printer and the like having a printing function. The image forming apparatuses 102a and 102b execute a printing process on print data according to control from the information processing apparatus 101. Note that the printing process executed by the image forming apparatus 102 includes, for example, a process of performing fax transmission/reception from an operation screen of the information processing apparatus 101 referred to as PC-FAX, and the like.

(V4 Printer Driver)

In the Windows OS from Windows 2000 to Windows 7, a printer driver architecture referred to as a Version 3 (hereinafter referred to as V3) printer driver has been adopted. Further, in the Windows OS of Windows 8 and beyond, in addition to the V3 printer driver, a printer driver architecture referred to as the V4 printer driver has been adopted.

In the V3 printer driver, a module (for example, a port monitor) that communicates with the image forming apparatus 102 is provided by the vendor together with the printer driver, and, therefore, it has been possible to manage a communication session (communication) with the image forming apparatus 102 on the printer driver side.

For example, in the case of a PC-FAX driver and the like, after a printing operation is performed from an application, the destination is set from the operation screen of the printer driver. In this case, after the operation with respect to the operation screen is ended, the printer driver starts a communication session with the image forming apparatus.

On the other hand, in the case of the V4 printer driver, the OS manages the communication with the image forming apparatus 102, and a communication session with the image forming apparatus 102 is started by the OS.

For example, in the case of the V4 printer driver, when printing from an application, a filter (rendering unit) developed by the vendor of the printer driver is called via an OS spooler and a filter pipeline manager. Further, an operation screen (user interface: UI) for making settings for printing is called from the filter.

Further, in the V4 printer driver, for example, when the printing starts and the printing process reaches the filter pipeline manager, a communication session with the image forming apparatus 102 is established by the control of the OS.

Therefore, in the case of the V4 printer driver, for example, after performing a print operation from the application, while the operation screen of the printer driver is being displayed, the communication session may be cut off from the image forming apparatus 102 side due to timeout and the like. In this case, there is a problem in that the image forming apparatus 102 cannot receive the print data, and, therefore, the printing cannot be performed; however, because the user cannot determine whether the session has been cut off, the user cannot recognize the reason why the printing cannot be performed.

Thus, the information processing apparatus 101 according to the present embodiment has a function in which, for example, after the printing operation is performed from the application, predetermined data is transmitted to the image forming apparatus 102 such that the communication session does not become cut off while the operation screen of the printer driver is being displayed. Therefore, it is possible to reduce occurrences of the communication being cut off from the image forming apparatus 102 due to time out.

As described above, according to the present embodiment, in the information processing apparatus 101 in which communication with the image forming apparatus 102 during a printing process is managed by the OS, it is possible to reduce occurrences of the communication (communication session) being cut off during the printing process.

<Hardware Configuration>

Next, the hardware configuration of the information processing apparatus 101 and the image forming apparatus 102 will be described.

(Hardware Configuration of Information Processing Apparatus)

Figure 2:
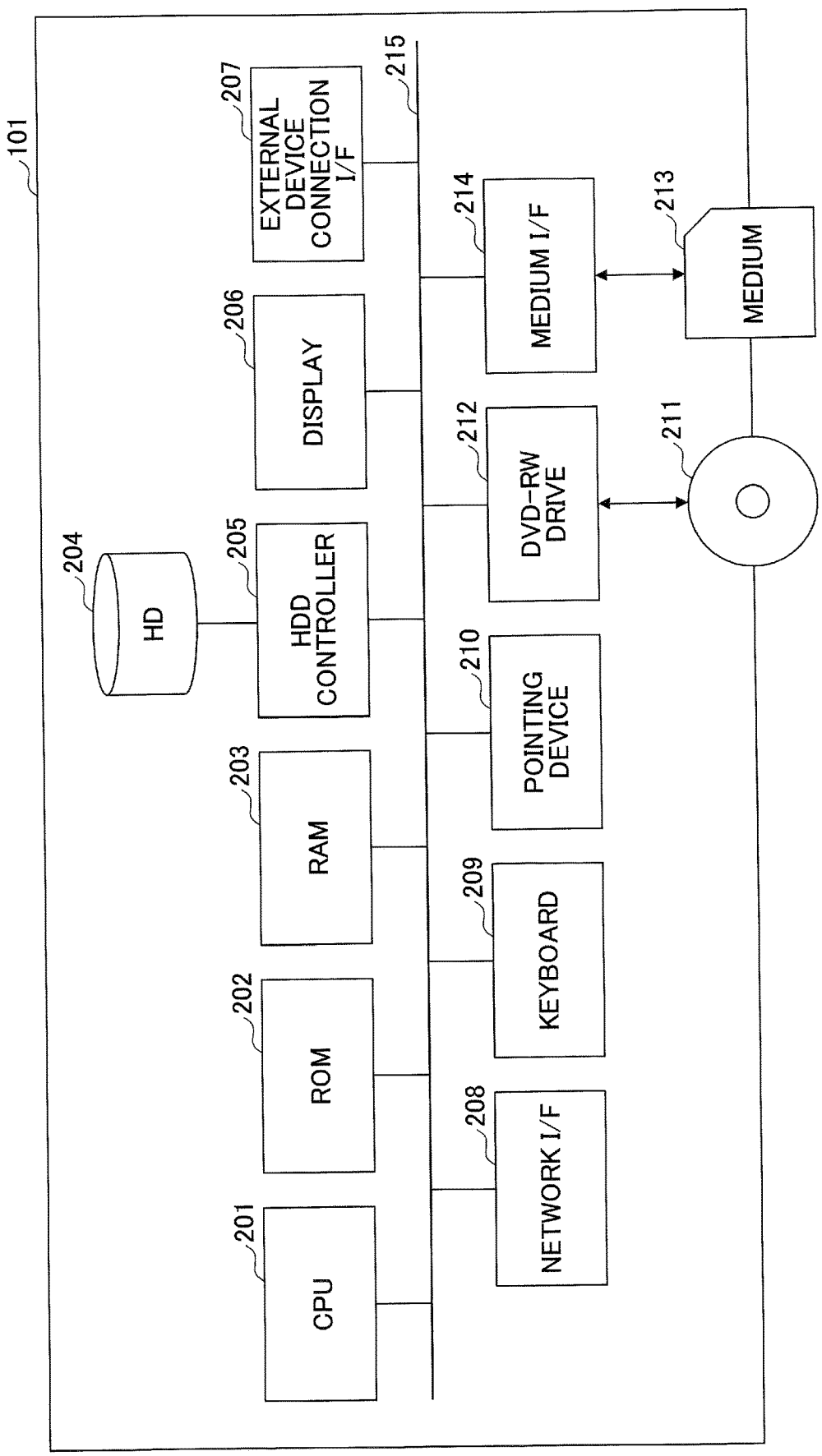
FIG. 2 is a diagram illustrating an example of a hardware configuration of an information processing apparatus according to an embodiment of the present invention.

FIG. 2 is a diagram illustrating an example of a hardware configuration of the information processing apparatus according to an embodiment. The information processing apparatus 101 has a configuration of a general computer and includes, for example, a Central Processing Unit (CPU) 201, a Read-Only Memory (ROM) 202, a Random Access Memory (RAM) 203, a Hard Disk (HD) 204, a Hard Disk Drive (HDD) controller 205, a display 206, an external device connection interface (I/F) 207, a network I/F 208, a keyboard 209, a pointing device 210, a Digital Versatile Disk Rewritable (DVD-RW) drive 212, a medium I/F 214, and a bus line 215.

Among these, the CPU 201 controls the operations of the entire information processing apparatus 101. The ROM 202 stores a program used to activate the CPU 201, such as an Initial Program Loader (IPL). The RAM 203 is used as a work area of the CPU 201. The HD 204 stores various kinds of data such as programs. The HDD controller 205 controls the reading or writing of various kinds of data with respect to the HD 204 according to the control of the CPU 201.

The display 206 displays various kinds of information such as a cursor, menus, windows, characters, images, and the like. The external device connection I/F 207 is an interface for connecting various external devices. In this case, the external device may include, for example, a Universal Serial Bus (USB) memory, a printer, and the like. The network I/F 208 is an interface for performing data communication by using a network 104.

The keyboard 209 is a type of input means including a plurality of keys for inputting characters, numbers, various instructions, and the like. The pointing device 210 is a type of input means for selecting and executing various instructions, selecting a processing target, moving the cursor, and the like. The DVD-RW drive 212 controls the reading or writing of various kinds of data with respect to a DVD-RW 211 as an example of a removable recording medium. Note that the DVD-RW 211 is not limited to a DVD-RW but may be a DVD-R and the like. The medium I/F 214 controls the reading or writing (storage) of data with respect to a medium 213, such as flash memory. The bus line 215 includes an address bus, a data bus, and various control signals for electrically connecting the above elements.

(Hardware Configuration of Image Forming Apparatus)

Figure 3:
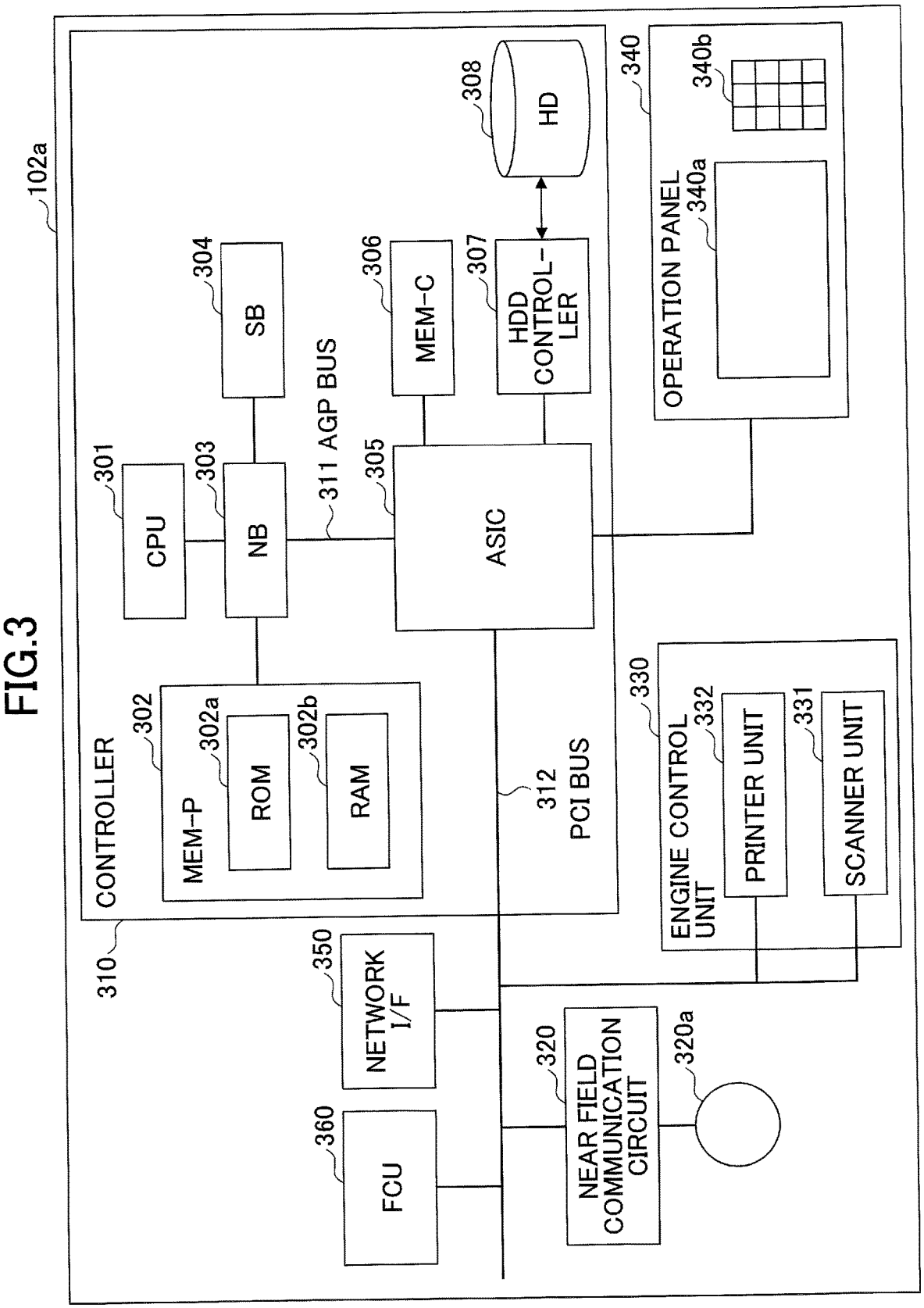
FIG. 3 is a diagram illustrating an example of a hardware configuration of an image forming apparatus according to an embodiment of the present invention.

FIG. 3 is a diagram illustrating an example of a hardware configuration of the image forming apparatus according to an embodiment. Here, as an example of the hardware configuration of the image forming apparatus 102, the hardware configuration of the image forming apparatus 102a having a configuration of an MFP will be described.

For example, as illustrated in FIG. 3, the image forming apparatus 102a includes a controller 310, a near field communication circuit 320, an engine control unit 330, an operation panel 340, a network I/F 350, a fax control unit (hereinafter referred to as FCU) 360, and the like.

Among these, the controller 310 includes a CPU 301 as the main part of the computer, a system memory (MEM-P) 302, a north bridge (NB) 303, a south bridge (SB) 304, an Application Specific Integrated Circuit (ASIC) 305, a local memory (MEM-C) 306 that is a storage unit, a HDD controller 307, and a HD 308 that is a storage unit. The NB 303 and the ASIC 305 are connected by an Accelerated Graphics Port (AGP) bus 311.

Among these, the CPU 301 is a control unit that performs overall control of the image forming apparatus 102a. The NB 303 is a bridge for connecting the CPU 301 to the MEM-P 302, the SB 304, and the AGP bus 311, and includes a memory controller for controlling reading and writing with respect to the MEM-P 302, a Peripheral Component Interconnect (PCI) master, and an AGP target.

The MEM-P 302 includes a ROM 302a, which is a memory for storing programs and data for implementing functions of the controller 310, and a RAM 302b, which is used for expanding programs or data and which is used as a rendering memory at the time of memory printing, and the like. Note that the programs stored in the RAM 302b may be provided by being recorded in a computer-readable recording medium such as a Compact Disk Read-Only Memory (CD-ROM), a CD recordable (CD-R), or a digital versatile disc (DVD) in a file of an installable format or an executable format.

The SB 304 is a bridge for connecting the NB 303 to PCI devices and peripheral devices. The ASIC 305 is an integrated circuit (IC) for image processing applications having hardware elements for image processing, and serves as a bridge connecting the AGP bus 311, a PCI bus 312, the HDD controller 307, and the MEM-C 306, respectively. The ASIC 305 includes a PCI target, an AGP master, an arbitrator (ARB) that forms the core of the ASIC 305, a memory controller that controls the MEM-C 306, a plurality of Direct Memory Access Controllers (DMACs) that rotates image data by a hardware logic, etc., and a PCI unit that performs data transfer between the scanner unit 331 and the printer unit 332 via the PCI bus 312. Note that the ASIC 305 may be connected to an interface of the USB or an interface of the Institute of Electronic and Electronic Engineers 1394 (IEEE 1394).

The MEM-C 306 is a local memory used as a copy image buffer and a code buffer. The HD 308 is a storage for storing image data, storing font data used for printing, and storing forms. The HD 308 controls the reading or writing of data with respect to the HD 308 according to the control of the CPU 301. The AGP bus 311 is a bus interface for a graphics accelerator card proposed for increasing the speed of graphics processing, and by directly accessing the MEM-P 302 with high throughput, the graphics accelerator card can be made faster.

The near field communication circuit 320 includes, for example, one or more near field communication units 320a. The near field communication unit 320a includes, for example, a wireless circuit that communicates in accordance with a standard of near field communication such as Near Field Communication (NFC), Bluetooth (registered trademark), etc., an antenna, a control circuit, and the like.

The engine control unit 330 is configured by, for example, a scanner unit 331 and a printer unit 332. The scanner unit 331 is a reading device for reading an original document and the like. The printer unit 332 is a printing device that prints the print data onto a printing medium. The scanner unit 331 or the printer unit 332 includes an image processing portion such as error diffusion or gamma conversion.

The operation panel 340 includes a panel display unit 340a, such as a touch panel, for displaying the present setting value, a selection screen, and the like, and for accepting input from an operator; and operation buttons 340b configured by a numeric pad for accepting a setting value of an image forming condition such as a density setting condition, and a start key for accepting an instruction to start copying. The controller 310 controls the entire image forming apparatus 102a and controls, for example, rendering, communication, input from the operation panel 340, and the like.

Note that in the image forming apparatus 102a, by using an application switching key of the operation panel 340, it is possible to sequentially switch and select among a document box function, a copy function, a printer function, and a fax function. When the document box function is selected, the document box mode is set, when the copy function is selected, the copy mode is set, when the printer function is selected, the printer mode is set, and when the fax function is selected, the fax mode is set.

The network I/F 350 is an interface for performing data communication by using the network 104. The FCU 360 transmits and receives fax data according to the protocol of fax communication. The near field communication circuit 320, the network I/F 350, the FCU 360, and the like are electrically connected, for example, to the ASIC 305 via the PCI bus 312.

First Embodiment

<Function Configuration According to First Embodiment>

Figure 4:
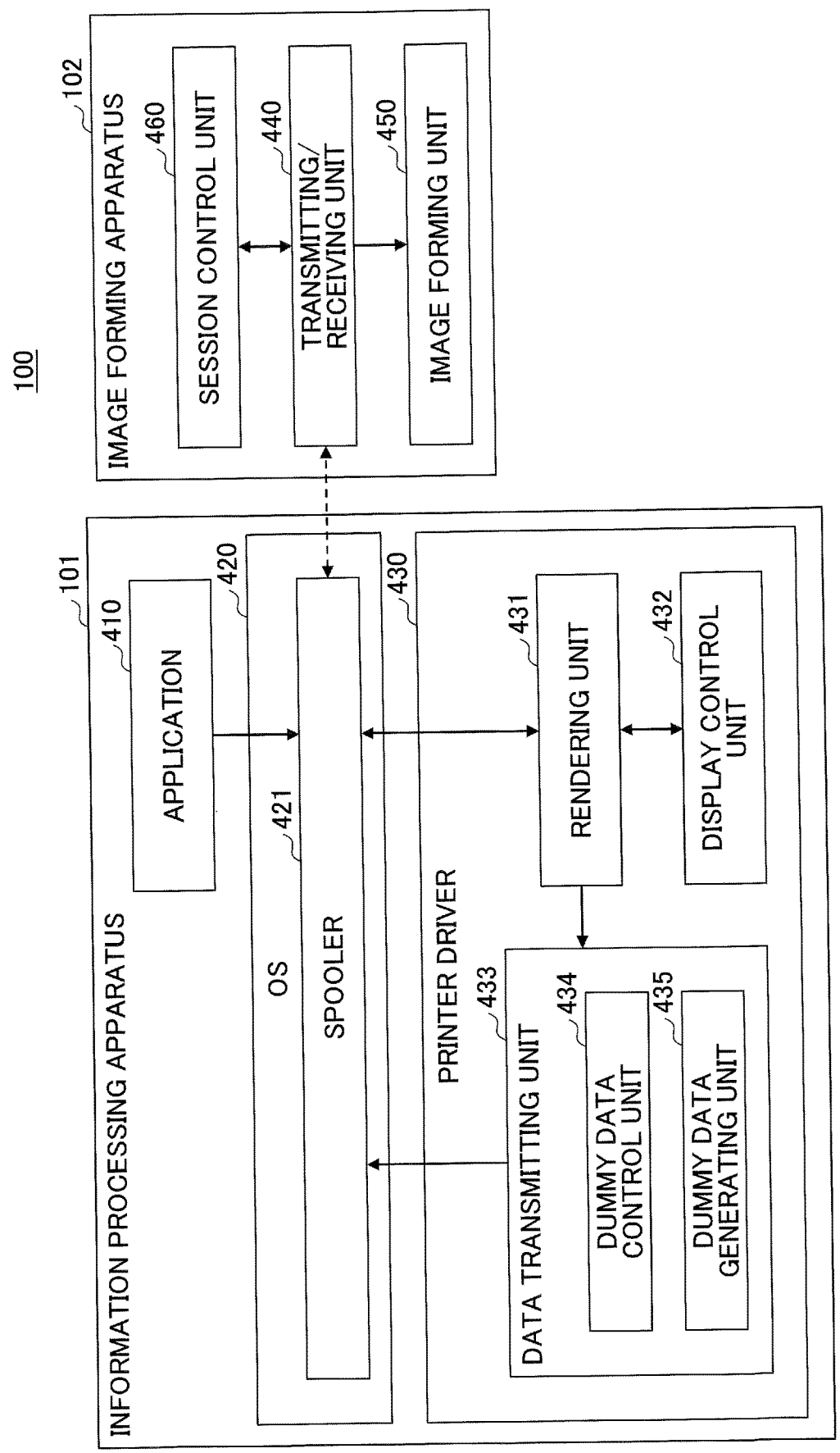
FIG. 4 is a diagram illustrating an example of a functional configuration of the image forming system according to a first embodiment of the present invention.

FIG. 4 is a diagram illustrating an example of a functional configuration of the image forming system according to a first embodiment.

(Functional Configuration of Information Processing Apparatus According to First Embodiment)

The information processing apparatus 101 executes programs (software) such as an application 410, an OS 420, a printer driver 430 and the like, for example, by the CPU 201 of FIG. 2.

The application 410 is an application program capable of instructing (requesting) printing to the OS 420, in accordance with a user's printing operation, for example, with respect to document creation software, image viewing/editing software, a browser, and the like.

The OS 420 is, a Windows OS, for example, Windows 8/Windows RT and later versions thereof.

The printer driver 430 is, for example, a printer driver such as a V4 printer driver or a later version thereof, and controls the printing process by the image forming apparatus 102. Note that the printing process performed by the image forming apparatus 102 is not limited to printing on a printing medium such as paper; for example, various image processes such as fax transmission may be included.

For example, the information processing apparatus 101 executes the printer driver 430 by the CPU 201 of FIG. 2 to implement a rendering unit 431, a display control unit 432, and a data transmitting unit 433. Note that the configuration of the printer driver 430 illustrated in FIG. 4 is an example. For example, the data transmitting unit 433 may be included in the rendering unit 431 or the display control unit 432, etc.

The rendering unit 431 converts the data to be printed (print target data) for which a print instruction has been given from the application 410, into print data that is printable by the image forming apparatus 102. For example, the rendering unit 431 converts the print target data in a format such as the XML Paper Specification (XPS) format created by the application 410, into print data in a format such as the Page Description Language (PDL) format that is printable by the image forming apparatus 102.

Further, the rendering unit 431 controls the display control unit 432, the data transmitting unit 433, and the like. Note that the rendering unit 431 may be referred to as a rendering filter, a filter, and the like.

For example, the display control unit 432 causes a display unit such as the display 206 and the like to display an operation screen for accepting settings, operations, and the like related to the printing process, in response to a request from the application 410, the rendering unit 431, and the like.

For example, when the display control unit 432 performs PC-FAX transmission, the display control unit 432 causes a display unit to display an operation screen for specifying a fax transmission destination, in response to a request from the rendering unit 431, and accepts an operation of setting a transmission destination, etc., by a user. Alternatively, the display control unit 432 may cause a display unit to display an operation screen for inputting authentication information or an operation screen for displaying a preview screen and the like in response to a request from the rendering unit 431, to accept a confirmation operation and the like by a user.

The data transmitting unit 433 transmits predetermined data to the image forming apparatus 102 via a spooler 421 in response to a request from the rendering unit 431 and the like. For example, when the display control unit 432 is displaying an operation screen, the data transmitting unit 433 transmits dummy data, which is for maintaining a communication session with the image forming apparatus 102, to the image forming apparatus 102 at predetermined time intervals, in response to a request from the rendering unit 431. For example, as illustrated in FIG. 4, the data transmitting unit 433 includes a dummy data control unit 434 and a dummy data generating unit 435.

The dummy data control unit 434 controls the transmission of dummy data. For example, the dummy data control unit 434 determines whether to transmit or stop transmitting the dummy data. Further, when transmitting the dummy data, the dummy data control unit 434 uses the dummy data generating unit 435 to generate the dummy data, and transmits the generated dummy data to the image forming apparatus 102 via the spooler 421.

The dummy data generating unit 435 generates dummy data in response to a request from the dummy data control unit 434. Note that the dummy data is an example of predetermined data used for maintaining the communication session (communication) with the image forming apparatus 102. The dummy data may be data that does not include special control contents or may be control data that explicitly instructs the maintenance of the communication session.

The spooler (an example of a communication control unit) 421 is one of the services provided by the OS 420 and is also referred to as a print spooler and the like. The spooler 421 temporarily saves requests for a plurality of printing processes (jobs) and performs a process of sequentially executing printing processes.

For example, the spooler 421 accepts a request for a printing process (hereinafter referred to as a print request) from the application 410, and reports the print target data, the print setting information (PrintTicket), and the like, to the rendering unit 431 of the printer driver 430.

Further, when the print target data and the like is reported to the rendering unit 431, the spooler 421 establishes a communication session in which communication regarding the printing process is performed with the image forming apparatus 102, and communicates with the image forming apparatus 102. Note that the spooler 421 is an example of a communication control unit that communicates with the image forming apparatus 102. The communication control unit that communicates with the image forming apparatus 102 may be implemented by services, modules, programs, etc., other than the spooler 421.

According to the above-described configuration, for example, when a user performs a printing operation from the application 410, the spooler 421 reports, to the rendering unit 431, the print target data accepted from the application 410, and establishes a communication session with the image forming apparatus 102. Note that here, it is assumed that an operation screen is displayed by the printing operation by the user, after a printing operation for performing, for example, PC-FAX transmission, or printing including inputting authentication information or printing a print preview, and the like.

Upon accepting the print target data, the rendering unit 431 uses the display control unit 432 to display an operation screen, and uses the data transmitting unit 433 to transmit the dummy data to the image forming apparatus 102 at predetermined time intervals (for example, 5 second intervals).

Further, when settings, operations, and the like with respect to the operation screen have been completed, the rendering unit 431 stops the transmission of dummy data by the data transmitting unit 433, converts the print target data into print data, and reports the print data to the spooler 421.

The spooler 421 transmits the print data reported from the rendering unit 431 to the image forming apparatus 102 in the communication session that has already been established.

(Functional Configuration of Image Forming Apparatus According to First Embodiment)

The image forming apparatus 102 implements a transmitting/receiving unit 440, an image forming unit 450, and a session control unit 460, for example, by executing a predetermined program by the CPU 301 of FIG. 3.

The transmitting/receiving unit 440 transmits and receives data with the information processing apparatus 101 according to the control from the session control unit 460.

The image forming unit 450 receives print data, setting information and the like transmitted from the information processing apparatus 101 via the transmitting/receiving unit 440 and executes a printing process (for example, printing, fax transmission, and the like) on the print data.

The session control unit 460 controls the transmitting/receiving unit 440 to establish, cut off, maintain, etc., a communication session for performing communication regarding the printing process with the information processing apparatus 101. For example, the session control unit 460 performs a process of establishing or cutting off the communication session with the information processing apparatus 101 in response to a request from the information processing apparatus 101. Further, the session control unit 460 cuts off the communication session when there is no transmission or reception of data with the information processing apparatus 101 for more than a communication maintenance time set in advance (for example, 15 seconds).

<Process Flow According to First Embodiment>

Next, a process flow of an image forming method according to the first embodiment will be described.

(Process by Information Processing Apparatus According to First Embodiment)

Figure 5:
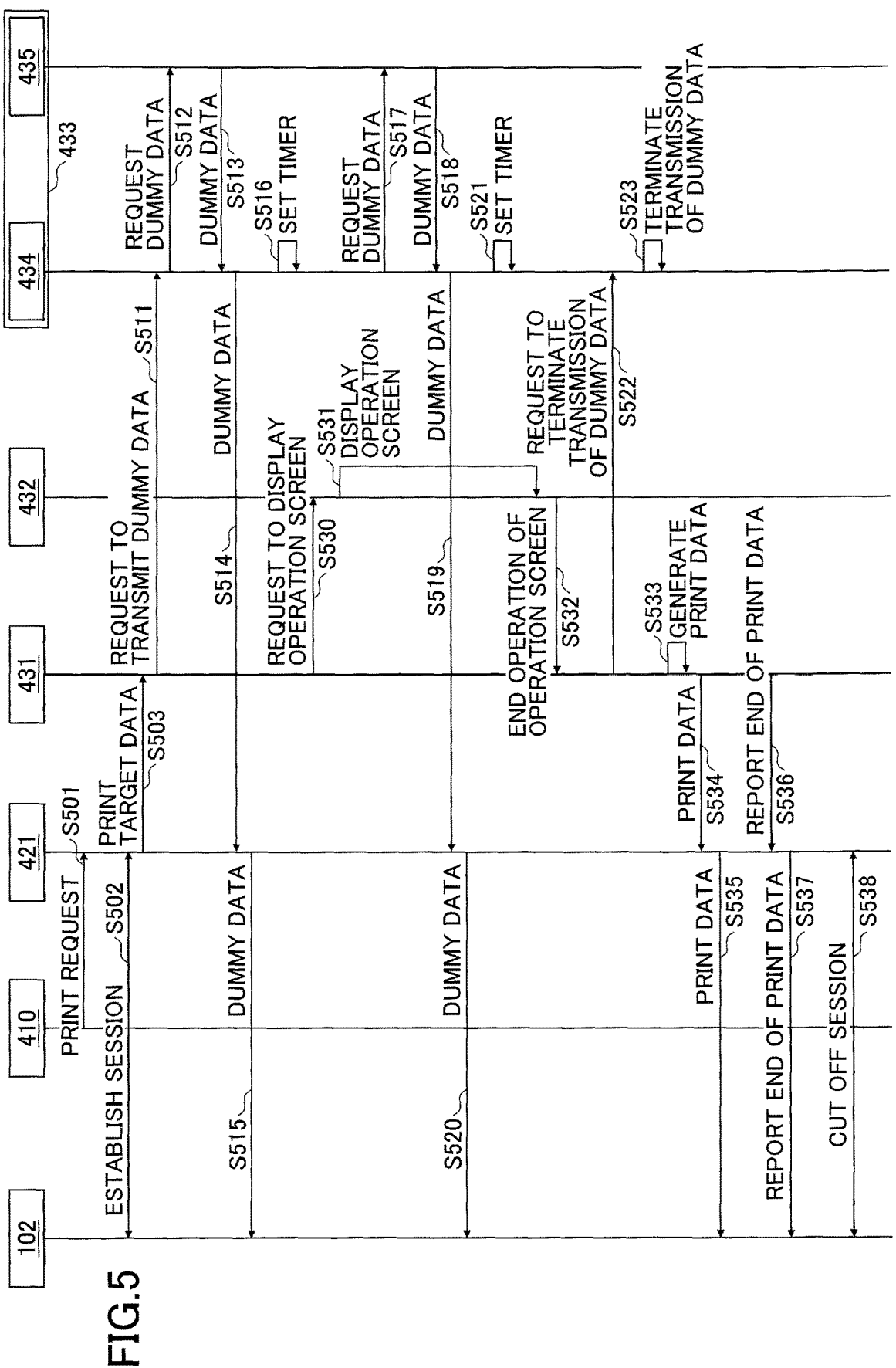
FIG. 5 is a sequence diagram illustrating an example of a process of the information processing apparatus according to the first embodiment of the present invention.

FIG. 5 is a sequence diagram illustrating an example of a process by the information processing apparatus according to the first embodiment. This process illustrates an example of a process executed by the image forming system 100 when a user performs a printing operation of displaying an operation screen, after a printing operation, for example, for PC-FAX transmission, preview printing, and the like, by using the application 410.

In step S501, the application 410 requests the spooler 421 of the OS 420 to start a printing process, in response to a printing operation by a user.

In step S502, the spooler 421 establishes a communication session (hereinafter referred to as a session) for performing communication regarding the printing process with the image forming apparatus 102.

In step S503, the spooler 421 transfers the print target data to the rendering unit 431 and requests to generate print data that is printable by the image forming apparatus 102. At this time, the spooler 421 may transfer print setting information together with the print target data, to the rendering unit 431.

Note that the process in step S503 may be executed prior to the process in step S502 or may be executed in parallel with the process in step S502.

In step S511, the rendering unit 431 activates a new thread and requests the data transmitting unit 433 to transmit dummy data. Thus, for example, the processes of steps S512 to S523 are executed in the new thread. Note that there are various methods of activating a new thread by the rendering unit 431; for example, the rendering unit 431 may activate a new thread using the "BeginThreadEx" function of Windows Application Programming Interface (API). Note that in the following description, the original thread before starting the new thread in step S503 is referred to as a "first thread", and the thread newly activated in step S503 is referred to as a "second thread".

Further, in step S530, the rendering unit 431 requests the display control unit 432 to display an operation screen 600, for example, as illustrated in FIG. 6, in the first thread. Thus, for example, the processes of the steps S531 to S538 are executed in the first thread. The operation screen 600 will be described later.

The process executed in the first thread and the process executed in the second thread are executed in parallel; here, the process executed in the second thread will be described first.

In step S512, when the data transmitting unit 433 activates as the second thread, the dummy data control unit 434 of the data transmitting unit 433 requests the dummy data generating unit 435 to generate dummy data.

In step S513, the dummy data generating unit 435 generates dummy data and transfers the generated dummy data to the dummy data control unit 434. Note that the dummy data is an example of predetermined data used to maintain the session with the image forming apparatus 102.

The dummy data generated by the dummy data generating unit 435 depends on the specification of the interface between the information processing apparatus 101 and the image forming apparatus 102, and, therefore, basically, the dummy data may be data of any format. However, when the dummy data is applied to an existing model, the corresponding data format is often not specified. In this case, the dummy data generating unit 435 generates a command for causing the image forming apparatus 102 to transition to a state of attempting to properly maintain the session.

As an example, the dummy data generating unit 435 generates dummy data 701 as illustrated in FIG. 7A. The description "<ESC>%-12345X@PJL JOB" in the first line of the dummy data 701 indicates the start of the PJL (registered trademark) (Printer Job Language), and is a command indicating that a print job will be started. Upon receiving this command, the image forming apparatus 102 transitions to a state of attempting to maintain the session, in order to receive data transmitted from the information processing apparatus 101.

Further, the description of "@PJL SET HOGE-HOGE=1234" in the second line of the dummy data 702 is a command without any particular meaning (dummy data).

In steps S514 and S515 of FIG. 5, the dummy data control unit 434 of the data transmitting unit 433 transmits the dummy data 701 to the image forming apparatus 102 via the spooler 421.

In step S516, the dummy data control unit 434 sets a timer for measuring the time until the next dummy data is to be transmitted (transmission interval), and shifts to a temporary pause state. For example, the dummy data control unit 434 may use the "Sleep" function of the Windows API to stop processing for a specified period of time.

Generally, the image forming apparatus 102 has a function of automatically cutting off a session when no data is transmitted or received with the information processing apparatus 101 for more than a predetermined communication maintenance time. This communication maintenance time varies depending on the image forming apparatus 102; for example, there is the image forming apparatus 102 that cuts off the session in 15 seconds, and there is the image forming apparatus 102 that cuts off the session in 300 seconds. Here, the following description will be given supposing that the minimum value of the communication maintenance time in the general image forming apparatus 102 is 15 seconds.

In this case, the information processing apparatus 101 can maintain a session with the image forming apparatus 102 by transmitting dummy data to the image forming apparatus 102 at a time interval of 15 seconds or less (for example, at 5 second intervals).

For example, when the dummy data control unit 434 sets the timer to 5 seconds in step S516, the process of step S517 is executed 5 seconds later.

In step S517, the dummy data control unit 434 requests the dummy data generating unit 435 to generate dummy data 702, for example, as illustrated in FIG. 7B. With the dummy data 701 transmitted the first time, the start of a job has been instructed by the description "<ESC>%-12345X@PJL JOB", but in the dummy data 702 transmitted the second time and beyond, this description is not required.

In step S518, the dummy data generating unit 435 generates the dummy data 702 and transfers the generated dummy data 702 to the dummy data control unit 434. The dummy data 702 is an example of predetermined data used to maintain a session with the image forming apparatus 102.

In steps S519 and S520, the dummy data control unit 434 of the data transmitting unit 433 transmits the dummy data 702 to the image forming apparatus 102 via the spooler 421.

In step S516, the dummy data control unit 434 sets a timer for measuring the time (transmission interval) until the next dummy data is to be transmitted, and shifts to the temporary pause state again.

As an example, the data transmitting unit 433 repeatedly executes the processes of steps S517 to S521 until accepting a request to terminate the transmission of the dummy data from the rendering unit 431.

Further, the dummy data control unit 434 terminates the transmission of dummy data in step S523, for example, when the dummy data control unit 434 accepts the request to terminate transmission of dummy data from the rendering unit 431 in step S522.

Next, the processes executed in the first thread will be described.

In step S530, the rendering unit 431 requests the display control unit 432 to display the operation screen.

In step S531, the display control unit 432 displays the operation screen 600, for example, as illustrated in FIG. 6, on a display unit, such as the display 206. In the V4 printer driver, the UI (the operation screen 600) displayed by the display control unit 432 is implemented, for example, by an exe file. In this case, the display control unit 432 can display the operation screen 600 by calling an exe file, for example, by using the "CreateProcessAsUser" function of the Windows API.

FIG. 6 illustrates an example in which the operation screen 600 is the setting screen for making the transmission setting of the PC-FAX. For example, the user may select a "destination table" 601 in the operation screen 600 to display the setting screen of the transmission destination as illustrated in FIG. 6 to set the fax transmission destination. Further, for example, the user may select a "transmission option" to set an option for fax transmission (e.g., color/black-and-white, image quality, etc.). Further, the user may select a "start" button 603 to start the fax transmission.

Note that the operation screen 600 illustrated in FIG. 6 is an example of an operation screen displayed by the display control unit 432 in step S531. The operation screen displayed by the display control unit 432 may be, for example, an operation screen for inputting an ID, a password, and the like, and for displaying a print preview, and the like.

In step S532, for example, when the user selects the "start" button 603, and the operation of the operation screen is ended, the display control unit 432 reports to the rendering unit 431 that the operation of the operation screen is ended. In response to this report, the rendering unit 431 transmits a request to terminate the transmission of dummy data to the data transmitting unit 433 in the second thread (step S522).

In step S533, the rendering unit 431 generates print data. For example, the rendering unit 431 creates print data (for example, PDL, etc.) that is printable by the image forming apparatus 102, by applying the setting accepted at the operation screen 600 and the like to the print target data accepted in step S503.

In step S534, the rendering unit 431 transfers the generated print data to the spooler 421. In step S535, the spooler 421 transmits the print data generated by the rendering unit 431 to the image forming apparatus 102 in the session established in step S502. Accordingly, the printing process is executed in the image forming apparatus 102.

In steps S536 and S537, the rendering unit 431 reports the end of the print data to the image forming apparatus 102 via the spooler 421. For example, at the end of the print job, there is end data 703 as illustrated in FIG. 7C, and, therefore, the rendering unit 431 reports the end data 703 to the image forming apparatus 102 via the spooler 421.

Accordingly, in step S538, the session with the image forming apparatus 102 is cut off.

(Process by Image Forming Apparatus According to First Embodiment)

FIG. 8 is a sequence diagram illustrating an example of a process by the image forming apparatus according to the first embodiment. This process illustrates an example of a process by the image forming apparatus 102 corresponding to the process of the information processing apparatus 101 described in FIG. 5. The processes of steps S502, S515, S520, S535, S537, and S538 in FIG. 8 correspond to the processes of steps S502, S515, S520, S535, S537, and S538 in FIG. 5.

In step S502 of FIG. 8, when a session with the information processing apparatus 101 is established, in step 3801, the transmitting/receiving unit 440 reports, to the session control unit 460, that data is received (data reception report) from the information processing apparatus 101.

In step 3802, the session control unit 460 determines whether to maintain the session.

In the present embodiment, it is assumed that the session control unit 460 maintains the session with respect to the first data reception report. Further, when the session control unit 460 determines that the elapsed time of a data reception report of the second time and onwards, from the previous data reception report, is within a communication maintenance time set in advance (for example, 15 seconds), the session control unit 460 determines to maintain the session. On the other hand, when the elapsed time from the previous data reception report exceeds the communication maintenance time set in advance, the session control unit 460 determines not to maintain the session (to cut off the session).

Here, this is the first data reception report, and, therefore, the session control unit 460 determines to maintain the session and instructs the transmitting/receiving unit 440 to maintain the session. Accordingly, in step S803, the transmitting/receiving unit 440 maintains the session.

In step S515, the transmitting/receiving unit 440 of the image forming apparatus 102 establishes a session in step S502, and then receives the dummy data 701 within a few seconds, for example. In response to this, in step S804, the transmitting/receiving unit 440 reports, to the session control unit 460, that the transmitting/receiving unit 440 has received the dummy data 701.

In step S805, the dummy data 701 has been received within 15 seconds from the previous data reception report, and, therefore, the session control unit 460 determines to maintain the session and instructs the transmitting/receiving unit 440 to maintain the session. Accordingly, in step S806, the transmitting/receiving unit 440 maintains the session.

In step S520, the transmitting/receiving unit 440 of the image forming apparatus 102 receives the dummy data 702, for example, about 5 seconds after receiving the previous dummy data 701 in step S515. Accordingly, in step S807, the transmitting/receiving unit 440 reports, to the session control unit 460, that the transmitting/receiving unit 440 has received the dummy data 702.

In step S808, the dummy data 702 has been received within 15 seconds from the previous data reception report, and, therefore, the session control unit 460 determines to maintain the session and instructs the transmitting/receiving unit 440 to maintain the session. Accordingly, in step S809, the transmitting/receiving unit 440 maintains the session.

In step S535, the transmitting/receiving unit 440 of the image forming apparatus 102 receives the print data within, for example, 5 seconds after receiving the dummy data 702 in step S520. In response to this, in step S810, the transmitting/receiving unit 440 transfers the received print data to the image forming unit 450.

In step S811, the image forming unit 450 executes a printing process (for example, printing, fax transmission, and the like) with respect to the print data accepted from the transmitting/receiving unit 440.

In step S537, when the transmitting/receiving unit 440 of the image forming apparatus 102 receives a report of the end of the print data from the information processing apparatus 101, in step S538, the transmitting/receiving unit 440 cuts off the session with the information processing apparatus 101.

As described above, the information processing apparatus 101 according to the present embodiment transmits, to the image forming apparatus 102, dummy data for maintaining the session with the image forming apparatus 102 at predetermined time intervals, while the operation screen 600 and the like is being displayed during the printing process.

Accordingly, according to the present embodiment, in the information processing apparatus 101 in which communication with the image forming apparatus 102 is managed by the OS 420 during the printing process, it is possible to reduce the occurrences of the communication being cut off during the printing process.

(Cancellation Process According to First Embodiment)

FIG. 9 is a sequence diagram illustrating an example of a cancellation process according to the first embodiment. This process illustrates an example of a cancellation process executed when a cancellation operation from the user is accepted in the operation screen 600 illustrated in FIG. 6.

Note that among the processes illustrated in FIG. 9, the processes of steps S501 to S503, S530, S531, and S511 to S521 are the same as the processes of the information processing apparatus according to the first embodiment illustrated in FIG. 5, and, therefore, here, the differences from the processes illustrated in FIG. 5 will be mainly described.

In step S901, the display control unit 432 accepts a cancellation operation by a user while the operation screen 600 illustrated in FIG. 6 is being displayed.

In this case, in step S902, the display control unit 432 ends the display of the operation screen 600 and reports, to the rendering unit 431, a cancellation report indicating that the cancellation operation has been accepted.

Thus, for example, in the second thread, the processes of steps S911 to S914 are executed. Further, in the first thread, the processes of the steps S921 and S922 are executed.

Here, the processes of steps S911 to S917 will be described first.

In step S911, the rendering unit 431 reports, to the data transmitting unit 433, the cancellation report indicating that the printing process has been canceled.

In step S912, the dummy data control unit 434 of the data transmitting unit 433 reports, to the dummy data generating unit 435, a job termination request requesting to generate a job termination command indicating to terminate the job.

In step S913, the dummy data generating unit 435 generates a job termination command indicating to terminate the job. As the job termination command, for example, the end data 703 as illustrated in FIG. 7C may be applied.

In steps S914 and S915, the dummy data control unit 434 of the data transmitting unit 433 transmits the job termination command generated by the dummy data generating unit 435 to the image forming apparatus 102 via the spooler 421.

In step S916, upon receiving the job termination command, the image forming apparatus 102 performs a process of terminating the job. For example, the transmitting/receiving unit 440 of the image forming apparatus 102 reports the received job termination command to the session control unit 460. Further, when the job termination command is accepted, the session control unit 460 determines that the session is not to be maintained and requests the transmitting/receiving unit 440 to cut off the session.

Accordingly, in step S917, the session is cut off.

Note that in parallel with the above-described processes of steps S911 to S917, the processes of the steps S921 and S922 are executed in the first thread.

In step S921, the rendering unit 431 performs a cancellation process of cancelling the printing process, and in step S922, the rendering unit 431 reports, to the spooler 421, a cancellation report indicating that the printing process has been canceled.

By the above process, the cancelled print process is ended.

Second Embodiment

In a second embodiment, an example in which it is possible to set the dummy data transmission interval, the dummy data transmission period, and the like described in the first embodiment, will be described.

<Functional Configuration According to Second Embodiment>

Figure 10:
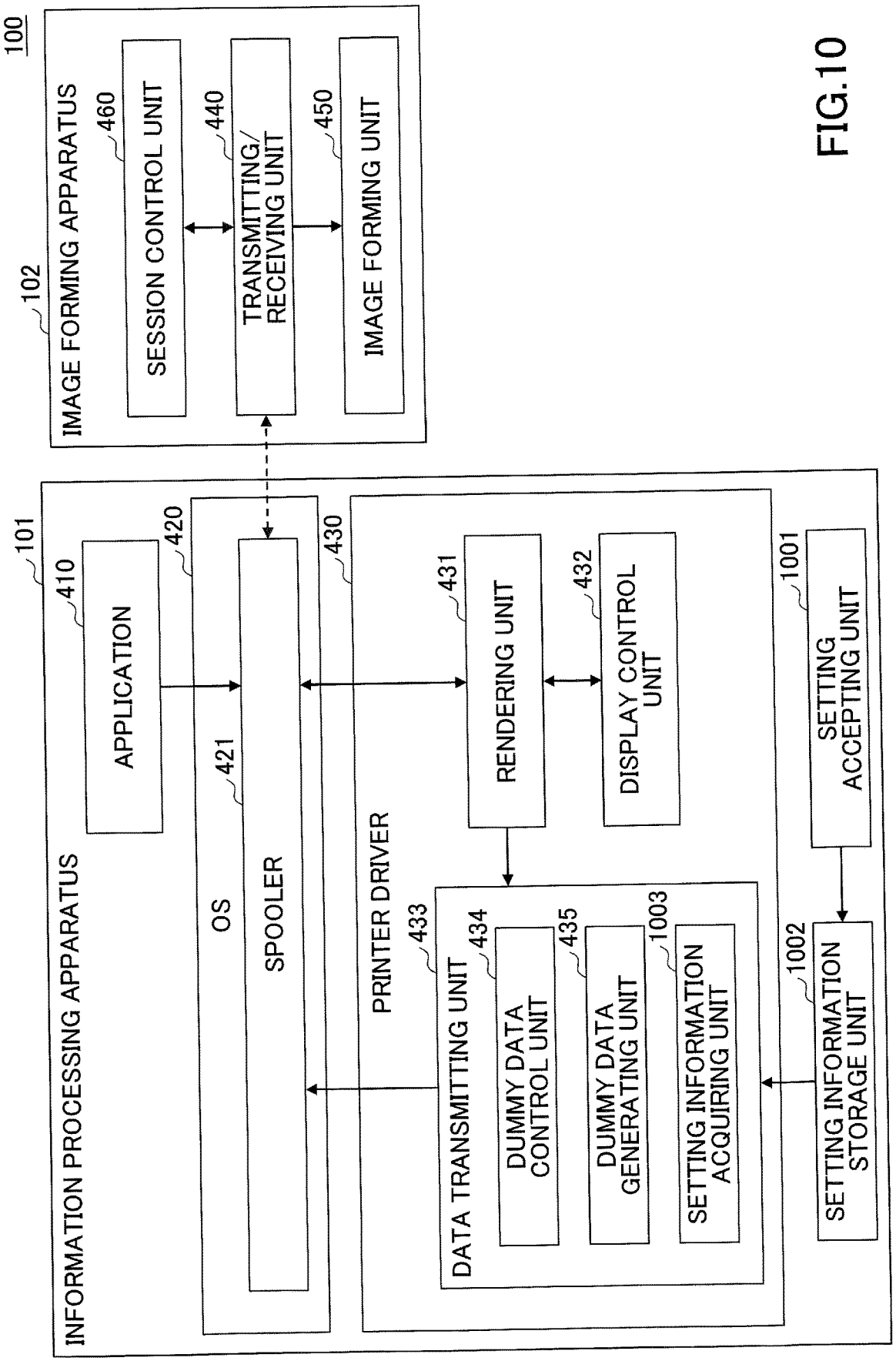
FIG. 10 is a diagram illustrating an example of a functional configuration of the image forming system according to a second embodiment of the present invention.

FIG. 10 is a diagram illustrating an example of a functional configuration of an image forming system according to the second embodiment. The information processing apparatus 101 according to the second embodiment includes a setting accepting unit 1001, a setting information storage unit 1002, and a setting information acquiring unit 1003 in addition to the functional configuration of the information processing apparatus 101 according to the first embodiment illustrated in FIG. 4.

The setting accepting unit 1001 is implemented by, for example, a program executed by the CPU 201 of FIG. 2. The setting accepting unit 1001 accepts a setting of a dummy data transmission interval, a dummy data transmission period, and the like, by a user (or an administrator), and stores the setting in the setting information storage unit 1002.

The setting information storage unit 1002 is implemented by, for example, a registry, a file and the like of the OS 420, and stores setting information such as the transmission interval of the dummy data, the transmission period of the dummy data, and the like, accepted by the setting accepting unit 1001.

The setting information acquiring unit 1003 is implemented by, for example, the printer driver 430 executed by the CPU 201 of FIG. 2 and acquires setting information such as a dummy data transmission interval and a dummy data transmission period stored in the setting information storage unit 1002.

With the above-described configuration, the user, etc., can use a setting screen displayed by the setting accepting unit 1001 to set the transmission period, which is the maximum time of transmitting dummy data, and the transmission interval, which is the time interval for transmitting dummy data, etc. Further, the information that has been set such as the transmission period, the transmission interval, and the like, is stored in the setting information storage unit 1002.

Further, the data transmitting unit 433 according to the second embodiment transmits dummy data to the image forming apparatus 102 according to the information such as the transmission period, the transmission interval, and the like, stored in the setting information storage unit 1002.

For example, similar to the first embodiment, the data transmitting unit 433 transmits dummy data to the image forming apparatus 102 at predetermined time intervals for a period during which the operation screen 600 is displayed. However, when the transmission period set in advance elapses, the transmission of dummy data is cancelled.

That is, after receiving a request to transmit dummy data, the data transmitting unit 433 transmits the dummy data to the image forming apparatus 102 at predetermined time intervals during the shorter period between the transmission period set in advance and the period during which the operation screen 600 is displayed (i.e., during whichever of the periods is shorter).

Further, when the transmission interval is stored in the setting information storage unit 1002, the data transmitting unit 433 can change the predetermined time interval for transmitting dummy data, to the transmission interval stored in the setting information storage unit 1002.

<Process Flow According to Second Embodiment>

Next, a process flow of an image forming method according to the second embodiment will be described.

(Process of Information Processing Apparatus According to Second Embodiment)

Figure 11:
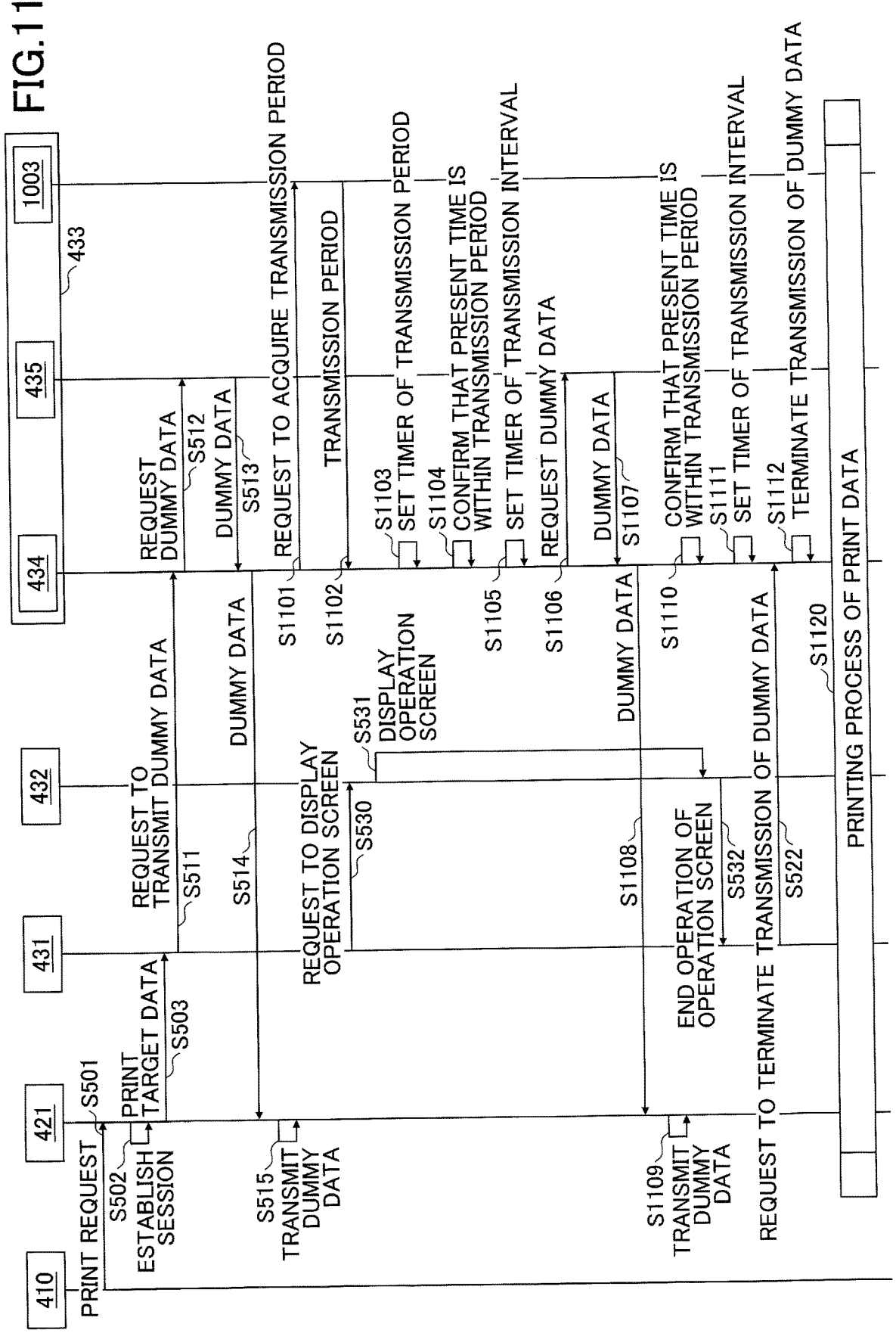
FIG. 11 is a sequence diagram illustrating an example of processing of the information processing apparatus according to the second embodiment of the present invention.

FIG. 11 is a sequence diagram illustrating an example of a process by the information processing apparatus according to the second embodiment. Note that at the starting time point of the process illustrated in FIG. 11, information of the transmission period set by the user and the like is stored in advance in the setting information storage unit 1002.

The process by the image forming apparatus 102 according to the second embodiment is the same as the process by the image forming apparatus 102 according to the first embodiment, and, therefore, here, the description of the process of the image forming apparatus 102 is omitted.

Further, among the processes illustrated in FIG. 11, the processes of steps S501 to S515, S530 to S532, and S522 are the same as the processes of the information processing apparatus according to the first embodiment illustrated in FIG. 5, and, therefore, here, the differences from the first embodiment will be mainly described.

In step S1101, the dummy data control unit 434 of the data transmitting unit 433 transmits the dummy data, and subsequently requests the setting information acquiring unit 1003 to acquire the transmission period set in advance.

In step S1102, the setting information acquiring unit 1003 acquires the transmission period stored in the setting information storage unit 1002 and reports the acquired transmission period to the dummy data control unit 434.

In step S1103, the dummy data control unit 434 sets the acquired transmission period to the timer.

In step S1104, the dummy data control unit 434 confirms whether the present time is within the transmission period set to the timer. When the present time is within the transmission period, the dummy data control unit 434 executes the process of step S1105. Note that when the transmission period has elapsed, the dummy data control unit 434 ends the process of transmitting the dummy data.

In step S1105, the dummy data control unit 434 sets the timer of the transmission interval and shifts to a temporary pause state. Accordingly, for example, when the timer of the transmission interval is set to 10 seconds, the process in step S1106 is executed 10 seconds later.

In step S1106, the dummy data control unit 434 requests the dummy data generating unit 435 to generate the dummy data 702, for example, as illustrated in FIG. 7B.

In step S1107, the dummy data generating unit 435 generates the dummy data 702 and transfers the generated dummy data 702 to the dummy data control unit 434.

In steps S1108 and S1109, the dummy data control unit 434 of the data transmitting unit 433 transmits the dummy data 702 to the image forming apparatus 102 via the spooler 421.

In step S1110, the dummy data control unit 434 confirms whether the present time is within the transmission period set to the timer, and when the present time is within the transmission period, the dummy data control unit 434 executes the process of step S1111. Note that when the transmission period has elapsed, the dummy data control unit 434 ends the process of transmitting the dummy data.

In step S1111, the dummy data control unit 434 sets the timer of the transmission interval and shifts to the temporary pause state.

In this state, for example, in step S522, when the request to terminate the transmission of dummy data reported from the rendering unit 431 is accepted, in step S1112, the dummy data control unit 434 terminates the transmission of the dummy data.

Further, in step S1120, for example, the printing process of the print data illustrated in steps S533 to S538 of FIG. 5 is executed.

(Determination Process by Dummy Data Control Unit According to Second Embodiment)

Figure 12:
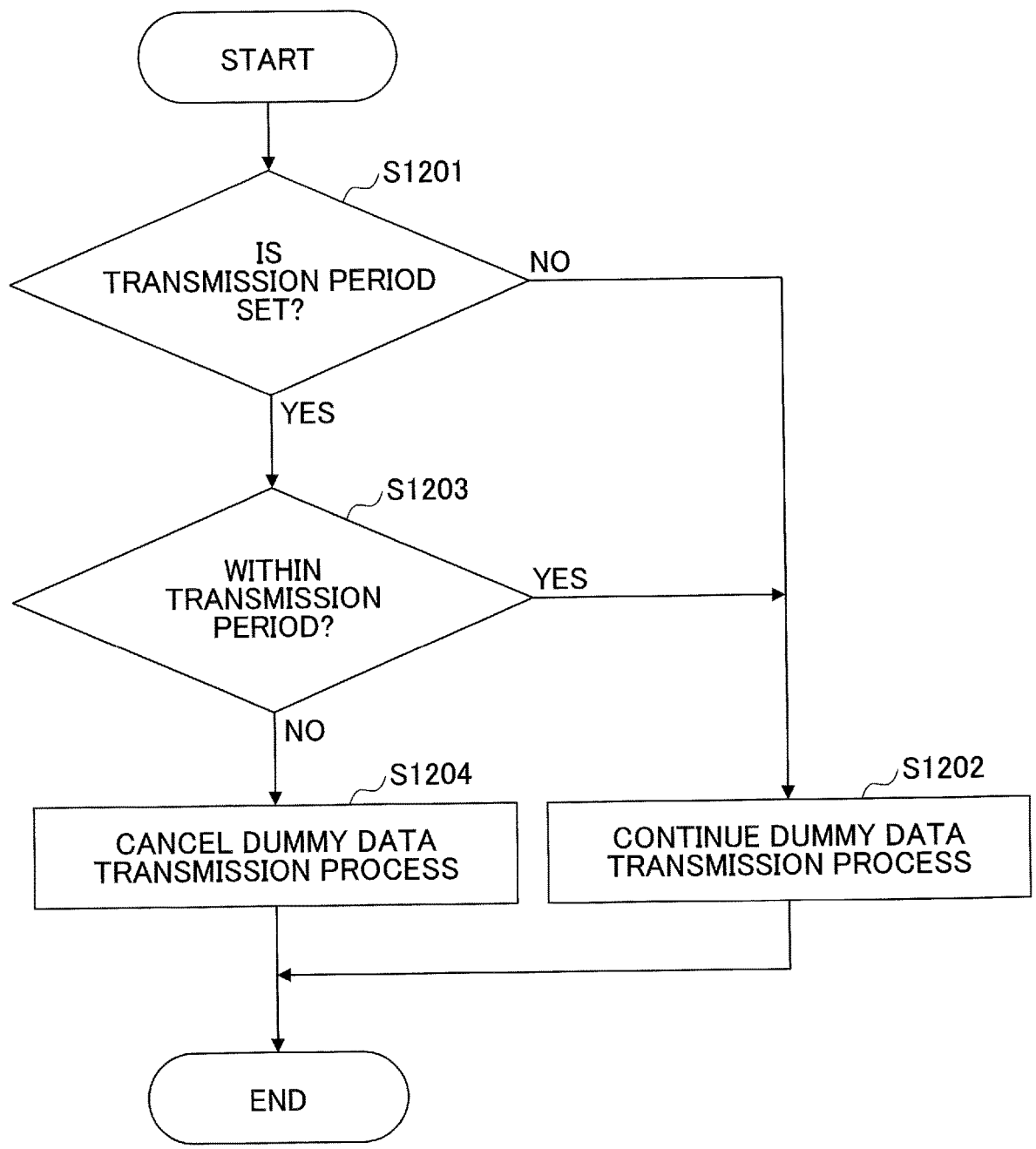
FIG. 12 is a flowchart illustrating an example of a determination process of a dummy data control unit according to the second embodiment of the present invention.

FIG. 12 is a flowchart illustrating an example of a determination process of the dummy data control unit according to the second embodiment. This process indicates an example of the determination process executed by the dummy data control unit 434, for example, in steps S1104 and S1110 of FIG. 11.

In step S1201, the dummy data control unit 434 determines whether the transmission period is set. For example, when the value of the transmission period set in advance is stored in the setting information storage unit 1002, in step S1103 of FIG. 11, the timer of the transmission period is set, and, therefore, the dummy data control unit 434 determines that the transmission period is set. On the other hand, when the value of the transmission period set in advance is not stored in the setting information storage unit 1002, in step S1103 of FIG. 11, the timer of the transmission period cannot be set, and, therefore, the dummy data control unit 434 determines that the transmission period is not set.

When the transmission period is not set, the dummy data control unit 434 causes the process to proceed to step S1202 and continues the process of transmitting the dummy data. On the other hand, when the transmission period is set, the dummy data control unit 434 causes the process to proceed to step S1203.

In step S1203, the dummy data control unit 434 determines whether the present time is within the set transmission period. For example, when the timer of the transmission period set in step S1103 of FIG. 11 has not expired, the dummy data control unit 434 determines the present time is within the transmission period. On the other hand, when the timer of the transmission period set in step S1103 of FIG. 11 has expired, the dummy data control unit 434 determines that the present time is not within the transmission period (the transmission period has been exceeded).

When the present time is within the transmission period, the dummy data control unit 434 causes the process to proceed to step S1202 and continues the process of transmitting the dummy data. On the other hand, when the present time is not within the transmission period, the dummy data control unit 434 causes the process to proceed to step S1204 and cancels (ends) the process of transmitting the dummy data.

As described above, when the data transmitting unit 433 according to the second embodiment accepts a request to transmit the dummy data from the rendering unit 431, the data transmitting unit 433 continuously transmits the dummy data at predetermined transmission intervals until the display of the operation screen is ended or the transmission period set in advance is exceeded.

Further, the user, etc., can set the transmission period and the transmission interval of dummy data by using a setting screen and the like provided by the setting accepting unit 1001.

As described above, according to each of the embodiments of the present invention, in the information processing apparatus 101 in which communication with the image forming apparatus 102 is managed by the OS 420 during the printing process, it is possible to reduce the occurrences of the communication being cut off during the printing process.

Accordingly, in the image forming system 100 according to the present embodiment, during the printing process, for example, even when an operation screen as illustrated in FIG. 6 is displayed for prompting the user to input a setting or an operation, the printing process can be properly performed.

<Supplement>

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC), a digital signal processor (DSP), a field programmable gate array (FPGA), and a conventional circuit module, designed to execute each function as described above.

According to one embodiment of the present invention, it is possible to reduce occurrences of the communication being cut off during a printing process, in an information processing apparatus in which communication with an image forming apparatus is managed by an OS during the printing process.

The information processing apparatus, the recording medium, and the image forming system are not limited to the specific embodiments described in the detailed description, and variations and modifications may be made without departing from the spirit and scope of the present invention.

What is claimed is:

1. An information processing apparatus that controls a printing process performed by an image forming apparatus, the information processing apparatus comprising:
   a communication controller configured to perform communication with the image forming apparatus;
   a display controller configured to cause a display to display an operation screen, for accepting a setting or an operation relating to the printing process;
   a data transmitter configured to, after the communication is established between the information processing apparatus and the image forming apparatus, transmit predetermined data that explicitly instructs a maintenance of the communication with the image forming apparatus to the information processing apparatus, said data transmitter being configured to start transmitting the predetermined data when a user of the image forming apparatus makes a request for displaying the operation screen and stop transmitting the predetermined data when the display controller stops displaying the operation screen; and
   a renderer configured to generate print data to be transmitted to the image forming apparatus by the communication, according to the setting or the operation accepted at the operation screen.

2. The information processing apparatus according to claim 1, wherein the data transmitter transmits the predetermined data to the image forming apparatus at predetermined time intervals, while the operation screen is being displayed.

3. The information processing apparatus according to claim 2, wherein the data transmitter transmits the predetermined data to the image forming apparatus at the predetermined time intervals, during a preliminarily set period or a period during which the operation screen is being displayed, whichever is shorter.

4. The information processing apparatus according to claim 2, wherein the predetermined time intervals is set to be shorter than a time that lapses before the communication is automatically terminated, thereby maintaining the communication.

5. The information processing apparatus according to claim 3, further comprising:
   a setting acceptor configured to accept a setting of at least one of the preliminarily set period and the predetermined time intervals.

6. The information processing apparatus according to claim 1, wherein transmission of the predetermined data and conversion of the print data are cancelled, upon detecting that the printing process has been cancelled.

7. The information processing apparatus according to claim 1, wherein
   the communication controller starts the communication in response to a request for the printing process, and
   the data transmitter transmits, to the image forming apparatus, data for maintaining the communication, while the operation screen is being displayed.

8. The information processing apparatus according to claim 1, wherein the information processing apparatus is configured to terminate transmitting the predetermined data to the image forming apparatus when a user press a start button of the printing process in the operation screen.

9. The information processing apparatus according to claim 1, wherein the operation screen is configured to receive instructions for at least one of authentications and setting parameters of functions of the image forming apparatus.

10. A non-transitory computer-readable recording medium storing a program that causes a computer to execute a process performed in an information processing apparatus that performs communication with an image forming apparatus and that controls a printing process performed by the image forming apparatus, the process comprising:
 causing a display to display an operation screen for accepting a setting or an operation relating to the printing process;
 transmitting, after the communication is established between the information processing apparatus and the image forming apparatus, predetermined data that explicitly instructs a maintenance of the communication with the image forming apparatus to the information processing apparatus, said transmitting being performed by starting transmitting the predetermined data when a user of the image forming apparatus makes a request for displaying the operation screen and stopping transmitting the predetermined data when the image forming apparatus stops displaying the operation screen; and
 generating print data to be transmitted to the image forming apparatus by the communication, according to the setting or the operation accepted at the operation screen.

11. The non-transitory computer-readable recording medium according to claim 10, wherein the transmitting includes transmitting the predetermined data to the image forming apparatus at predetermined time intervals, while the operation screen is being displayed.

12. The non-transitory computer-readable recording medium according to claim 11, wherein the transmitting includes transmitting the predetermined data, to the image forming apparatus at the predetermined time intervals, during a preliminarily set period or a period during which the operation screen is being displayed, whichever is shorter.

13. The non-transitory computer-readable recording medium according to claim 12, the process further comprising:
 accepting a setting of at least one of the preliminarily set period and the predetermined time intervals.

14. The non-transitory computer-readable recording medium according to claim 10, the process further comprising:
 cancelling transmission of the predetermined data and conversion of the print data, upon detecting that the printing process has been cancelled.

15. The non-transitory computer-readable recording medium according to claim 10, the process further comprising:
 starting the communication in response to a request for the printing process, wherein
 the transmitting includes transmitting, to the image forming apparatus, data for maintaining the communication, while the operation screen is being displayed.

16. An image forming system comprising:
 an image forming apparatus; and
 an information processing apparatus that controls a printing process performed by the image forming apparatus, wherein the information processing apparatus includes:
  a communication controller configured to perform communication with the image forming apparatus;
  a display controller configured to cause a display to display an operation screen for accepting a setting or an operation relating to the printing process;
  a data transmitter configured to transmit, after the communication is established between the information processing apparatus and the image forming apparatus, predetermined data that explicitly instructs a maintenance of the communication with the image forming apparatus to the information processing apparatus, said data transmitter being configured to start transmitting the predetermined data when a user of the image forming apparatus makes a request for displaying the operation screen displayed and stop transmitting the predetermined data when the display controller stops displaying the operation screen; and
  a renderer configured to generate print data to be transmitted to the image forming apparatus by the communication, according to the setting or the operation accepted at the operation screen, and wherein
 the image forming apparatus includes:
  a transmitter/receiver configured to start the communication with the information processing apparatus in response to a request from the information processing apparatus;
  a session controller configured to maintain the communication upon receiving the predetermined data by the communication from the information processing apparatus; and
  an image former configured to execute the printing process with respect to the print data transmitted by the communication from the information processing apparatus.

17. The image forming system according to claim 16, wherein the data transmitter transmits the predetermined data to the image forming apparatus at predetermined time intervals, while the operation screen is being displayed.

18. The image forming system according to claim 17, wherein the data transmitter transmits the predetermined data to the image forming apparatus at the predetermined time intervals, during a preliminarily set period or a period during which the operation screen is being displayed, whichever is shorter.

19. The image forming system according to claim 18, wherein the information processing apparatus further includes:
 a setting acceptor configured to accept a setting of at least one of the preliminarily set period and the predetermined time intervals.

20. The image forming system according to claim 16, wherein transmission of the predetermined data and conversion of the print data are cancelled by the information processing apparatus, upon detecting that the printing process has been cancelled.

21. The image forming system according to claim 16, wherein
 the communication controller starts the communication in response to a request for the printing process, and
 the data transmitter transmits, to the image forming apparatus, data for maintaining the communication, while the operation screen is being displayed.

* * * * *